United States Patent
Daoud

[19]

[11] Patent Number: 5,996,944
[45] Date of Patent: Dec. 7, 1999

[54] TROUGH HAVING COMPARTMENTS FOR SECURING CABLES AND WIRES

[75] Inventor: Bassel Hage Daoud, Parsippany, N.J.

[73] Assignee: Lucent Technologies Inc., Murray Hill, N.J.

[21] Appl. No.: 09/143,205

[22] Filed: Aug. 28, 1998

[51] Int. Cl.[6] .................................................... F16L 3/22
[52] U.S. Cl. ...................... 248/68.1; 174/135; 248/68.1
[58] Field of Search .......................... 248/68.1, 49, 74.1, 248/65; 174/135; 379/428

[56] References Cited

U.S. PATENT DOCUMENTS

| | | | |
|---|---|---|---|
| 4,845,316 | 7/1989 | Kaercher | 248/68.1 X |
| 5,669,590 | 9/1997 | Przewodek | 248/68.1 |
| 5,868,362 | 2/1999 | Daoud | 248/68.1 X |
| 5,884,372 | 3/1999 | Anscher et al. | 248/74.1 X |

Primary Examiner—Ramon O. Ramirez

[57] ABSTRACT

A trough for separately retaining different types of cables and/or wires to facilitate identification and handling of the cables and/or wires. The trough comprises at least two compartments. An upper compartment comprises a base having a pair of arms extending upwardly therefrom, enclosing a space for retaining a first type of cables and/or wires. A lower compartment comprises an integral arm and a pivotable arm downwardly extending from the base, enclosing a space for retaining a second type of cables and/or wires. A locking mechanism comprises of a screw, a countersink at the pivotable arm for the head of a screw and a receptacle at the integral arm for the shank of the screw is provided to maintain the pivotable arm in a closed position and in contact with the integral arm.

8 Claims, 6 Drawing Sheets

TROUGH HAVING COMPARTMENTS FOR SECURING CABLES AND WIRES

CROSS REFERENCE TO RELATED APPLICATION

This application is related to U.S. patent application Ser. No. 09/143,202 and also identified by Docket Number Daoud 122 and is assigned to the same assignee as the present invention.

FIELD OF THE INVENTION

The invention relates to a device for securing and retaining cables and wires, which facilitates their identification and handling by separating different types of cables and/or wires into different compartments.

BACKGROUND OF THE INVENTION

Different types of cables and wires enter and exit a junction box; for example, telephone cables, fiber optics and wires or cables for transmission of voice data and facsimile. In a complex telephone network, the number of cables and wires can be numerous and may result in a complex maze of cables and wires intertwined together in the area surrounding a junction box. Some of the cables or wires, such as fiber optics, are generally permanently connected to an end location; whereas, other cables or wires, such as copper telephone wires, require frequent servicing to interconnect or cross-connect, which involves disconnecting and re-connecting the cables or wires. Hence, there is a need for a device that separately retain cables or wires that are permanently connected from those requiring frequent servicing by allocating them to a different area where their identification and handling is simplified. Furthermore, separating these cables and wires into different areas minimizes the confusion, and possible servicing wrong type of cables or wires.

A prior art device provides for the separation of wires by utilizing troughs. The prior art trough has two arms extending from a base, with the tips of each arm almost touching each other, enclosing a space between the arms with a gap between the tips of the arms. The prior art trough is designed for inserting wires through the gap into the space between the arms. The gap is designed to only fit wires through and it provides quick access to the wires. Hence, the prior art trough can secure and retain wires only. For use with a telephone network, the prior art trough is designed to be snap mounted onto the surface of a telephone junction box, adjacent to the exit and entry slots of the junction box, to properly secure and retain wires exiting and entering the junction box.

Although the prior art trough retains wires, it does not provide for the separation and isolation of different types of cables and wires. Both permanently connected wires and those require frequent servicing may become entangled in a prior art trough. When a service technician attempts to trace a wire for servicing, he/she may accidentally pull on the permanently connected wires and damage the wires. This is especially problematic if the wires are fiber optic lines, which are delicate and may crack at the splice or connection point.

Therefore, there is a need for an invention that retains cables, allows quick access to cables or wires requiring frequent servicing and isolates and secures permanently connected cables or wires.

SUMMARY OF THE INVENTION

The invention provides a device for securing and retaining different types of cables and wires separately, which facilitates their identification and handling.

The invention provides a trough having compartments for separately retaining and securing cables and wires to allow quick access to those cables or wires requiring frequent servicing and isolating and securing others not often requiring servicing, such as those permanently connected cables or wires.

The trough of the present invention comprises at least two compartments, here defined as an upper and a lower compartment. The upper compartment comprises a base having two arms upwardly extending therefrom, one from each end of the base. The two arms enclose a space therebetween for retaining a first type of cables or wires. The tips of the two arms overlap each other in a spaced, offset position, creating a gap between the tips of the two arms where wires may be slid through the gap into the space for quick access.

The lower compartment comprises an integral L-shaped arm and a pivotable arm downwardly extending from each end of the common base. The pivotal arm is provided with a locking system which maintains the pivotal arm in position and contact with the L-shaped arm to form the lower compartment. Advantageously, one end of the pivotal arm has a countersink for positioning a screw, which shank engages a mating receptacle in the L-shaped arm. The pivotable arm provides entry to the lower compartment for separating and isolating wires, such as those that are permanently connected to prevent mishandling.

DETAILED DESCRIPTION OF THE PREFERRED EMBODIMENTS

Figure 1:
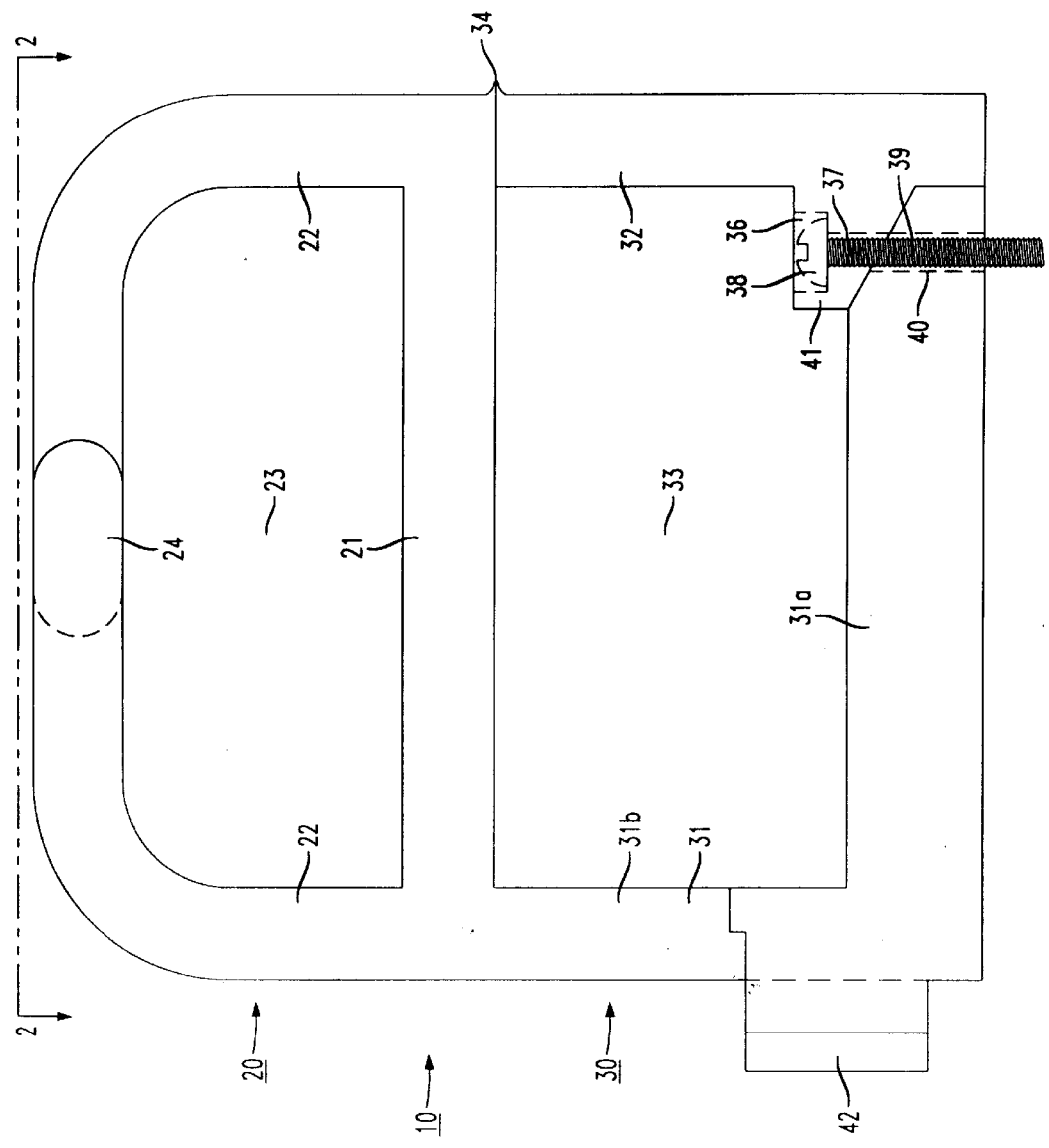
FIG. 1 is a front view of the present invention illustrating the upper and lower compartments.

With reference to the drawings, wherein the same reference number indicates the same element throughout, there is shown in FIG. 1 a front view of the present invention.

The present invention, trough 10, as shown in FIG. 1, comprises an upper compartment 20 and a lower compartment 30. The upper compartment 20 comprises a base 21 having a pair of arms 22 extending upwardly therefrom, one from each end of base 21. Arms 22 are shown to be L-shaped, but other shapes, curved or straight (not shown), is contemplated and does not detract from the spirit of the present invention. Enclosed between the pair of arms 22 is space 23 for securing and retaining a first type of wires or cables.

The lower compartment 30 comprises an integral L-shaped arm 31 and a pivotable arm 32 extending downwardly from each end of common base 21. L-shaped arm 31 and pivotable arm 32 enclose space 33 for securing and retaining a second type of wires or cables. Pivotable arm 32 pivots from a closed to an open position to provide access and facilitate insertion of large cables or a large number of cables or wires into space 33, best shown in FIG. 4. Pivot point 34 is shown as a living hinge, but other pivotable means known to one skilled in the art may be substituted.

An alternative to having pivotable arm 32 is to fixed arm 32 while adding a pivoting joint between the L-shaped arm 31 to allow the horizontal portion 31a of the L-shaped arm to pivot away from the vertical portion 31b (not shown).

The free end 35 of pivotable arm 32 has a locking system which maintains pivotal arm 32 in contact and in position with L-shaped arm 31 to secure and isolate cables or wires in lower compartment 30. The locking system comprises a countersink 36 on free end 35 of pivotable arm 32, a screw 37 having a head 38 and shank 39 and a threaded receptacle 40 in L-shaped arm 31. Shank 39 of screw 37 is inserted through countersink 36 to engage mating receptacle 40 to lock pivotable arm 32 in position with L-shaped arm 31. Countersink 36 provides an open channel 41 of a predetermined width slightly larger than the diameter of shank 39 and smaller than the diameter of head 38, best shown in FIGS. 5 and 6, wherein the release of the locking system can be accomplished by loosening screw 37 such that the screw head 38 clears countersink 36 to allow shaft 39 to pass through channel 41 upon pivoting arm 32 from a closed to an open position. Henceforth, with the presence of channel 41, screw head 38 need to seat in countersink 36 to prevents arm 32 from pivoting away from L-shaped arm 31. Although the locking system of trough 10 is shown to be at the free end of 35 of pivotable arm 32, it may similarly be on the L-shaped arm 31 where pivotable arm 32 mates (not shown).

Additional security of the locking mechanism may be provided for the lower compartment 30 by utilizing a security screw (not shown), such as those generally known to one skilled in the telephone art, wherein a special tool is necessary to disengage the security screw. Other methods of positive engagement of pivotable arm 32 to L-shaped arm 31 known to one skilled in the arm may be substituted, for example, a latch-hook system.

Figure 2:
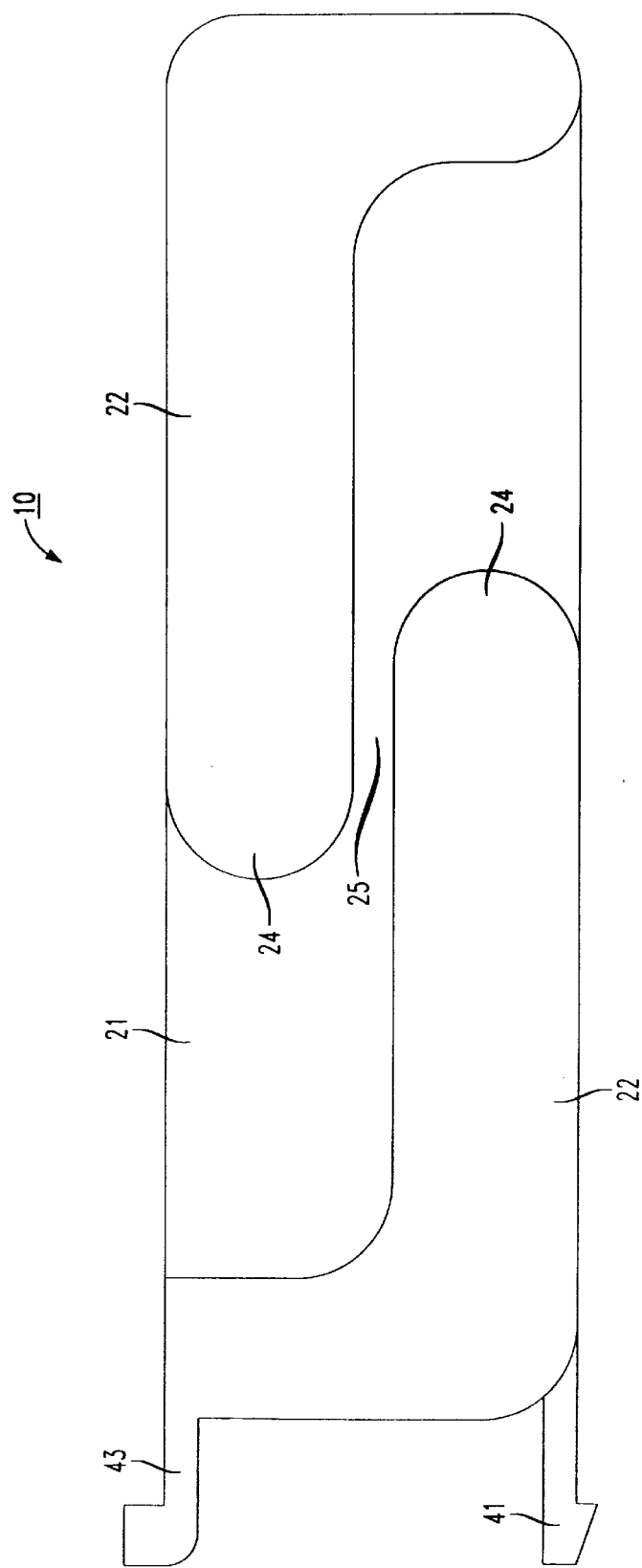
FIG. 2 is a top plan view illustrating the offset arms, taken along line 2—2 in FIG. 1.

FIG. 2 shows arms 22 extending from base 21 in an offset position. Advantageously, tips 24 of arms 22 overlap each other and spaced apart to form a gap 25 therebetween. Wires may be slid into space 23 through gap 25 and the offset and overlapping position of arms 22 prevents accidental slippage of wires from space 23. While the overlapping tips 24 are shown in a plane parallel to base 21, i.e. both tips 24 are equidistance from base 21, the overlapping tips 24 could also be in a plane that include base 21, i.e. one of the tip 24 is closer to base 21 than the other tip 24 (not shown).

Trough 10, as shown in FIGS. 1 and 2, is adapted for use with a telephone junction box. As shown in FIG. 1, extending from L-shaped arm 31 is a latch 42 and a hook 43 for hooking and snap mounting trough 10 onto mating units on the surface of a junction box (not shown). Placing trough 10 at a location adjacent to the junction box facilitates the allocation of different types of wires and/or cables entering and exiting a junction box. Trough 10 can also be adapted for mounting along a wall by providing at least one hole (not shown) on L-shaped arm 31 or arm 22 through which screws or nails may be driven to secure trough 10. Similarly, other mounting methods known to one skill in the art may be used to secure trough 10 to a location where its use is contemplated.

Figure 3:
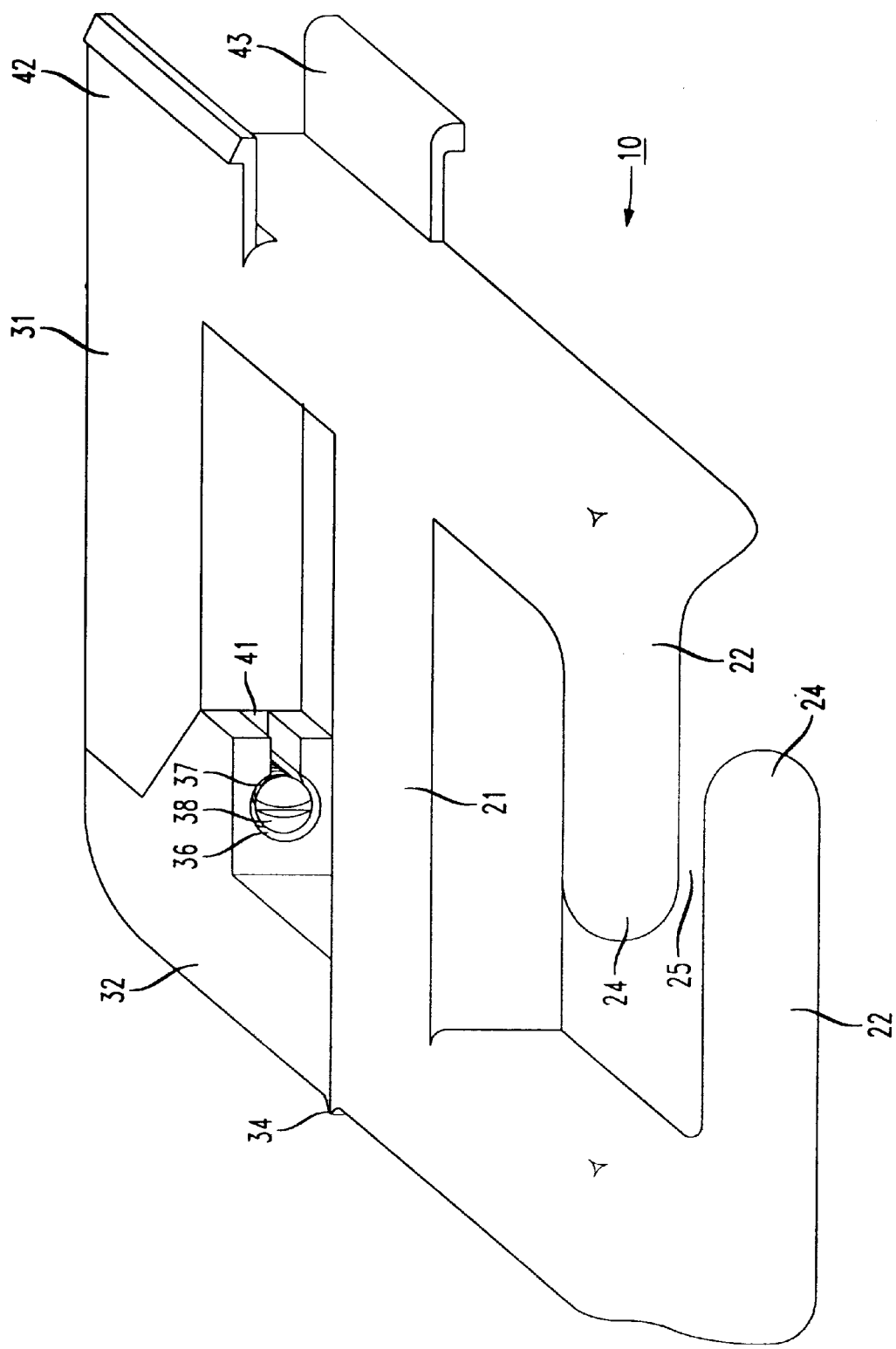
FIG. 3 is a perspective view of the present invention.

FIG. 3 shows a perspective view of trough 10, a better illustration of the features of the present invention.

Figure 4:
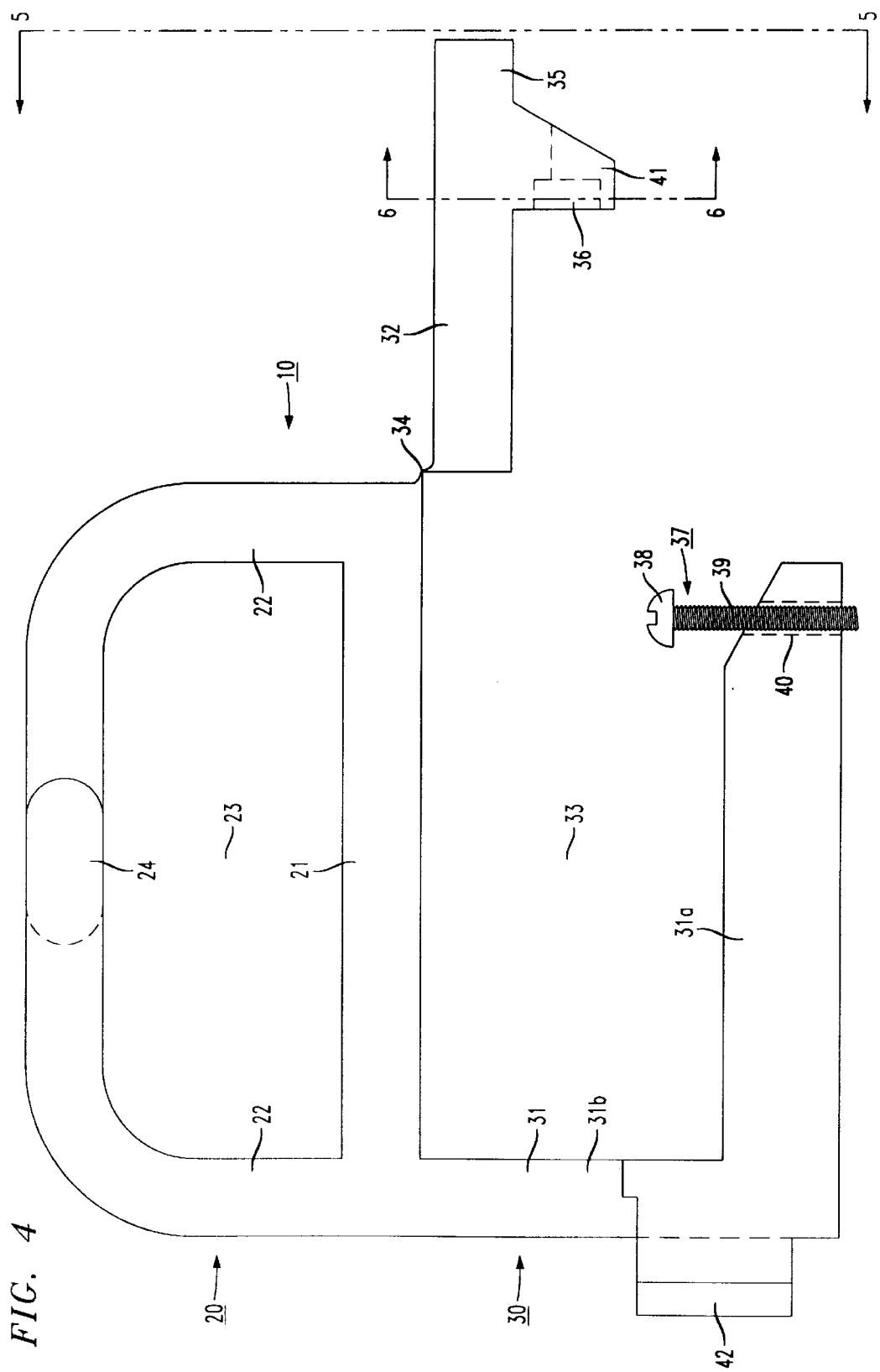
FIG. 4 is a front view illustrating the pivotable arm in an open position.

FIG. 4 shows pivotable arm 32 in an open position. Pivotable arm 32 provides access for cables or wires to be positioned in the second compartment 30 for separation and isolation in space 33.

Figure 5:
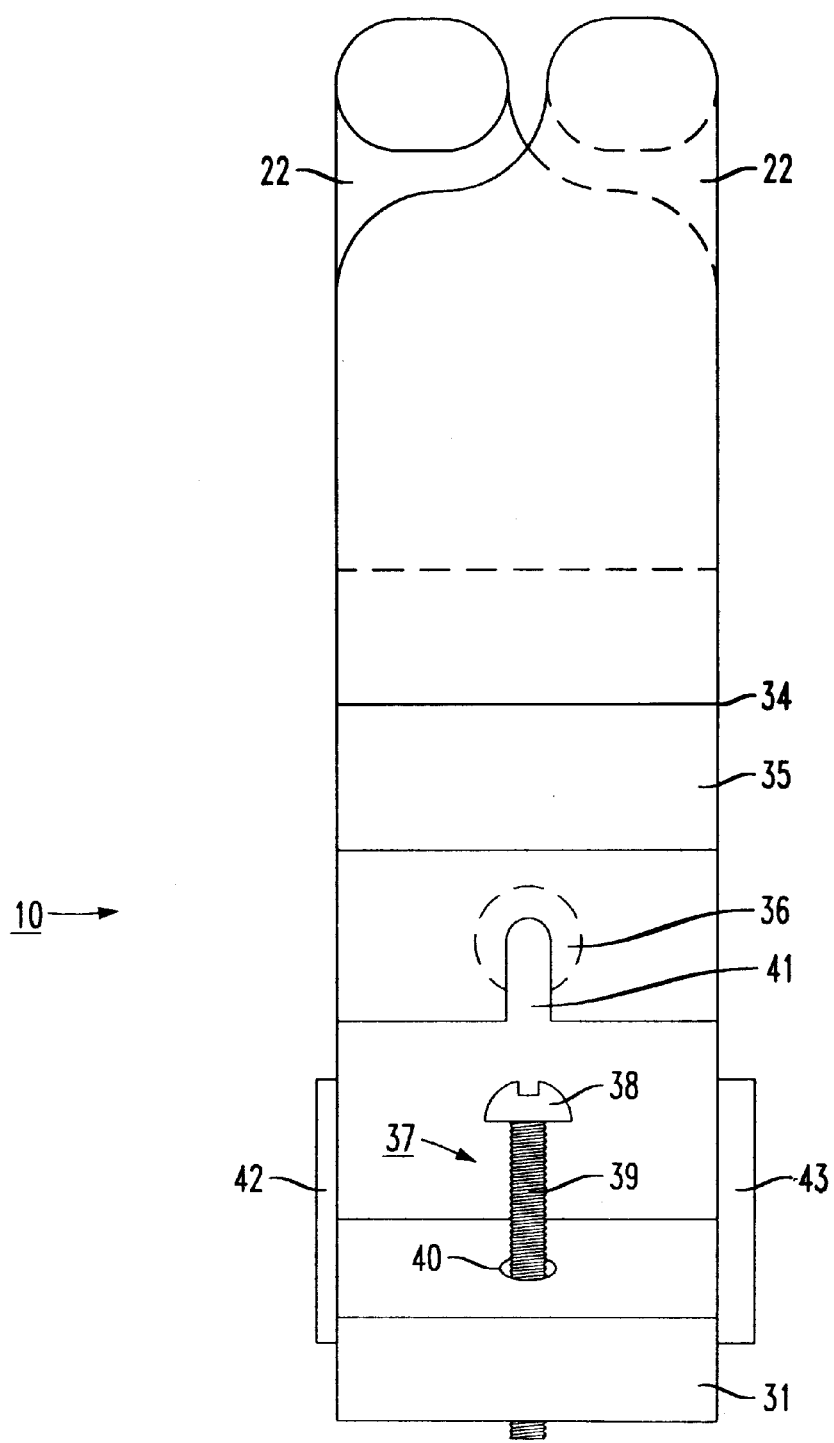
FIG. 5 is a side view taken along line 5—5 in FIG. 4.

FIG. 5 is a side view of trough 10 illustrating arms 22, free end 35 of pivotable arm 32, screw 37 and mating receptacle 40 of L-shaped arm 31.

Figure 6:
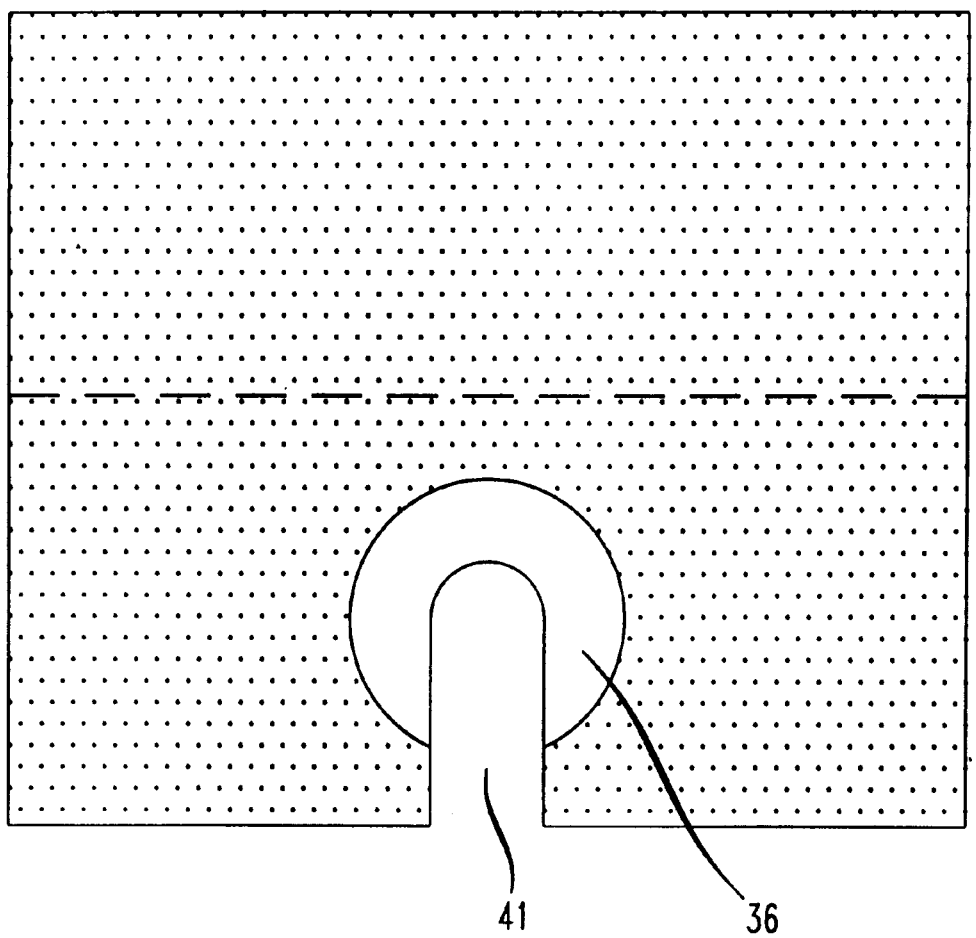
FIG. 6 is a cross-sectional view of the countersink taken along line 6—6 in FIG. 4.

FIG. 6 is a cross-sectional view of free end 35 of pivotable arm 32 illustrating countersink 36 having open channel 41.

The specification above discussed a trough 10 having two compartments 20 and 30. However, troughs having more than two compartments are contemplated, which may include a third or more compartments below the lower compartment, similar to either the upper or lower compartments 20 and 30, which corresponds to the description for a two compartment trough 10 and is not separately discussed herein.

Although certain features of the invention have been illustrated and described herein, other better modifications and changes will occur to those skilled in the art. It is, therefore, to be understood that the appended claims are intended to cover all such modification and changes that fall within the spirit of the invention.

What I claim is:

1. A device for separately retaining at least first and second types of wires and/or cables comprising:
    a base having first and second opposite sides;
    at least two compartments;
    a first compartment comprises a pair of arms extending from said first side of said base enclosing a first space therebetween, each of said pair of arms having a tip, said pair of arms being offset from each other such that said tips are spaced from and overlap each other defining a gap between said tips for sliding said first type of wires and/or cables into said first space for retaining said first type of wires and/or cables; and
    a second compartment comprises an integral arm and a pivotable arm extending from said second opposite side of said base enclosing a second space therebetween for retaining said second type of wires and/or cables when said pivotable arm is in a closed position and in contact with said integral arm.

2. The device according to claim 1 wherein said pair of arms of said first compartment and said integral arm of said second compartment are L-shaped.

3. The device according to claim 1 wherein said pivotable arm pivots at said base from a closed position to an open position to allow access to said second space by said second type of wires and/or cables.

4. The device according to claim 1, further having a locking system for maintaining said pivotable arm in a closed position and in contact with said integral arm to isolate and secure said second types of cables or wires.

5. The device according to claim 4, wherein said locking system comprises:
    a countersink on said pivotable arm;
    a receptacle on said integral arm; and
    a screw having a shank, said shank passes through said countersink and mates with said receptacle to maintain said pivotable arm in contact with said integral arm.

6. The device according to claim 5, wherein said screw further having a head with a predetermined diameter larger than a predetermined diameter of said shank, said countersink having a predetermined diameter larger than said diameter of said head, said countersink having an open channel having a predetermined width slightly larger than said diameter of said shank and smaller than said diameter of said head, whereby the release of the locking system is accomplished by loosening said screw such that said head clears said countersink to allow said shaft to pass through said open channel upon pivoting said pivotable arm from a closed to an open position.

7. The device according to claim 5 wherein said screw is a security screw.

8. A device for separately retaining a first and second types of telephone wires and/or cables entering and/or exiting a junction box, said junction box having mating units for mounting said device, comprising:

a first compartment comprises a base with first and second opposite sides having a pair of arms extending from said first side of said base, enclosing a first space therebetween, each of said pair of arms having a tip, said pair of arms being offset from each other such that said tips are spaced from and overlap each other defining a gap between said tips for sliding said first type of wires and/or cables into said first space for retaining said first type of wires and/or cables;

a second compartment comprises an integral arm and a pivotable arm extending from said second opposite side of said base, enclosing a second space therebetween for retaining said second type of wires and/or cables when said pivotable arm is in a closed position and in contact with said integral arm; and a hook and latch extending from said integral arm for engaging respective mating units on said junction box.

* * * * *